United States Patent [19]

Nyborg

[11] Patent Number: 5,451,286
[45] Date of Patent: Sep. 19, 1995

[54] METHOD OF WELDING THERMOPLASTIC MATERIAL

[75] Inventor: Henrik Nyborg, Værlose, Denmark

[73] Assignee: Weldan A/S (Evald A. Nyborg A/S), Lynge, Denmark

[21] Appl. No.: 107,737
[22] PCT Filed: Feb. 25, 1992
[86] PCT No.: PCT/DK92/00056
 § 371 Date: Aug. 25, 1993
 § 102(e) Date: Aug. 25, 1993
[87] PCT Pub. No.: WO92/14602
 PCT Pub. Date: Sep. 3, 1992

[30] Foreign Application Priority Data

Feb. 25, 1991 [DK] Denmark ............... 0322/91

[51] Int. Cl.6 .................................. B32B 31/00
[52] U.S. Cl. .................... 156/274.4; 156/378; 156/289; 156/308.4; 156/367; 156/379.6
[58] Field of Search ............... 156/378, 274.4, 289, 156/308.2, 308.4, 367, 379.6; 219/243, 482, 490, 497

[56] References Cited

U.S. PATENT DOCUMENTS

| 2,714,416 | 8/1955 | Fener . |
| 3,484,325 | 12/1969 | Pendleton . |
| 4,416,713 | 11/1983 | Brooks ................ 156/378 |

FOREIGN PATENT DOCUMENTS

| 103207 | 11/1965 | Denmark . |
| 0033822 | 8/1981 | European Pat. Off. . |
| 0201677 | 11/1986 | European Pat. Off. . |
| 0288147 | 10/1988 | European Pat. Off. . |
| 0335270 | 10/1989 | European Pat. Off. . |
| 0373907 | 6/1990 | European Pat. Off. . |
| 2127539 | 12/1972 | Germany . |
| 3604026 | 8/1987 | Germany . |
| WO91/07860 | 5/1991 | WIPO . |

*Primary Examiner*—Chester T. Barry
*Attorney, Agent, or Firm*—Oblon, Spivak, McClelland, Maier & Neustadt

[57] ABSTRACT

By the welding of plastic material, the plastic material is placed between a welding electrode of a profile and pattern mating the welding to be performed, and a counter electrode comprising one or several pulse heating wires. Together the pulse heating wires cover the pattern of the welding electrode and project preferably a short distance beyond the welding electrode. The pulse heating wires are furthermore mutually and outwardly electrically insulated. A separating tape of a higher melting point than the plastic material has been inserted between the pulse heating wires and the plastic material. The welding press comprises a welding plane with the welding electrode and a fixing plane for the counter electrode. The temperature of the welding electrode can be kept constant and within a temperature range of approximately 20° C. to approximately 250° C. The fixing plane is non-heated. The pulse heating wires are secured to the fixing plane and are mutually and outwardly electrically insulated. Each pulse heating wire communicates with a current source and an electronic regulator capable of setting and regulating the temperature and heating period of each pulse heating wire very accurately.

21 Claims, 9 Drawing Sheets

METHOD OF WELDING THERMOPLASTIC MATERIAL

TECHNICAL FIELD

The invention relates to a method of welding an embossing and/or welding and/or parting seam in one or more layers of material containing heat-weldable, especially thermoplastic plastic material, by means of indirect heating of the plastics in a welding press, by using a welding electrode arranged against one side of the material, said welding electrode in particular being an upper electrode of a welding profile and pattern mating the welding to be performed, where the temperature of the welding electrode is kept constant and preferably below the softening point of the plastic material.

The invention relates furthermore to a welding press for carrying out the method and comprising a welding plane and a fixing plane, where the welding plane is provided with a welding electrode of a welding profile and pattern mating the welding to be carried out and the temperature of which can be kept constant within a temperature range of approximately 20° C. and approximately 250° C., and where at least one plane can be moved towards and away from the other plane.

BACKGROUND ART

Heat contact welding is traditionally used for embossing, welding, cutting, and producing of bending lines in thermoplastic material, said welding involving a direct or an indirect heating or an HF-welding when it is a question of welding plastic materials presenting a sufficiently high dielectric loss, such as in case of PVC.

The HF-welding is advantageous in only using a single electrode, i.e. the welding electrode, whereas the heating of the material is caused by the dielectric losses in the material with the result that the method is very easy and convenient to perform and does not require a production of exactly mating and accordingly expensive electrodes. The HF-generator of the machine is, however, very expensive and involves a high consumption of energy. The method has gradually been extensively used especially for welding PVC.

A heat contact welding involving an indirect heating of the plastics employs usually a welding electrode and a counter electrode, where both electrodes are heated, the welding electrode being heated to a temperature about the softening temperature of the plastics and the counter electrode being heated to a temperature exceeding the melting temperature of the plastics. The welding electrode includes the particular welding profile acting directly on the possibly Teflon-coated top side of the plastics, whereas the counter electrode is plane and shielded from the plastics by means of a separation tape of a higher melting point than the plastics. The latter method has been extensively used for welding thin sheets, but can only be used to a limited extent for welding thick sheets and materials because the heat must be conducted through the plastics in order to reach the welding spot, and accordingly the top side of the plastics is heated more than the welding spot, which causes problems of heat damages of the plastics outside the welding seams. In order to obtain high production rates, attempts have been made at operating at temperatures being as high as possible, but such procedures only made the situation worse because the high temperatures and high amounts of heat, especially in the bottom tool, involved a considerably increased risk of the sheets being damaged. A consequence of the unintended heating is that the sheets turn soft and form bulges, especially in connection with even very short breaks. Attempts have been made at solving this problem by establishing suitable screening devices and cooling devices, but these devices did not provide satisfactory results when thick sheets were involved.

The above problems have become particularly topical because of the present requirements for restricting the use of PVC so as to reduce the environmental damages. Accordingly, a demand has arisen for using other types of plastics, especially polyolefines. These types of plastics cannot, however, like PVC be welded by way of HF-welding in a satisfactory manner, and accordingly it is necessary to use heat-contact welding although such a welding does not provide satisfactory results.

The problem applies in particular to the use of polyolefines for the manufacture of thick-walled products, such as loose-leaf binders or more composite products, such as various wrappers comprising a varying number of layers of material and consequently of a varying thickness on various locations of the product. In particular the use of polypropylene causes problems because said material presents a very narrow temperature range (approximately 8° C.) for being weldable.

Pulse heat welding has furthermore been used within the packing industry, especially for the manufacture of bags, where the heating is carried out by means of electrically heated resistance wires. This method is, however, only used for thin sheets, and as far as the appearance is concerned the quality of the weldings has been very poor compared to the requirements that can be met by HF-welding PVC.

In EP-A-335 270 is disclosed a welding press for welding of heat-weldable material by means of indirect heating, and including a welding electrode and a counter electrode, both being electrically heated permanently and comprising thermostats (not shown). A heat-conducting separating tape is separating the counter electrode from the material. The temperature control is insufficient for welding of polyolefines of more than 100 μm.

In DE-A-21 27 539 is disclosed an apparatus comprising pulse heating wires secured to the counter electrode. Variations of the termperature across the width of the pulse heating wires is disclosed, however, no disclosure of the temperature control is available. The apparatus is unable to provide an embossing or a parting seam.

For a long time the opening of various types of packing made of heat-weldable sheet material of a thickness of approximately 50 to 100 μm has furthermore been a growing source of irritation to the users, because it is almost impossible to open such packings by means of the fingers alone. The latter problem applies to a wide range of packed articles including building materials, feedstuff and fertilizers, furniture, tools, household articles, clothes, toys, gift articles, food, stimulants etc. It is often necessary to use tools, such as scissors or knives, with the result that injuries easily arise to the packed article or the user. It has not previously been possible to provide a satisfactory solution of this problem by the known welding methods.

DESCRIPTION OF THE INVENTION

The object of the present invention is accordingly to provide an improved method and an associated apparatus for heat contact welding especially of thick plastic materials including polyolefines, where the resulting weldings as far as the appearance is concerned fully meet the results presented by HF-welding of PVC, and which in addition can be used for the manufacture of packings with airtight separation lines, which are sufficiently strong in use of the packing, but which allow an easy opening of the packing by the user without necessitating the use of tools.

The new and characteristic features of the method according to the invention are found in using a counter electrode of a corresponding pattern and arranged against the other side of the material and formed by one or several pulse heating wires, which are mutually and outwardly electrically insulated and cover the welding electrode and project a short distance beyond said welding electrode, where the pulse heating wire(s) is(are) secured to a non-heated fixing plane, especially a water-cooled fixing plane, such as a bottom plane, and where each pulse heating wire communicates with a current source and an electronic regulator, as well as a heat-conducting separating tape arranged between the pulse heating wire(s) and the material and being of a higher melting point than the plastic material, especially in form of a conveyor belt for the material, and where a current is shortly transmitted through the pulse heating wire(s) during the welding immediately before or after the welding press has been completely closed with the result that said wire(s) are heated and emit heat to the material, the electronic regulator being set such that a temperature is obtained in the pulse heating wire(s) in a temperature range immediately above the melting point of the plastic material in question, said temperature being controlled by the electronic regulator within a temperature range of ±2° C. by measuring at intervals of 20 milliseconds the voltage across and the current intensity in the pulse heating wire(s), providing an indication of the temperature(s) of the pulse heating wire(s) and correcting for deviations from the set value(s) during a predetermined period being sufficiently long for ensuring the desired result, whereafter the current through the pulse heating wire(s) is interrupted, the press is opened, and the material is immediately cooled on the cold fixing plane before fresh material is advanced for welding.

In this manner it turned out surprisingly to be possible to carry out weldings of an even very high quality in all types of heat-weldable material. Most advantageously the welding is carried out at temperatures lower than the temperatures conventionally used by heat welding with indirect heating by means of conventional brass electrodes both for the welding electrodes and for the counter electrode. Thus extremely good results were for instance obtained by welding polypropylene at temperatures of 120° C. for the welding electrode and 170° C. for the pulse heating wire, respectively, where the conventional welding of polypropylene typically uses temperatures of 130° C. for the welding electrode and 230° C. for the counter electrode, respectively. Although the method according to the invention thus operates at temperatures lower than the conventional temperatures, especially as far as the counter electrode is concerned, quite acceptable welding speeds are nevertheless obtained with the result that the method according to the invention can also compete with respect to the expenditure of time. The combination of the low temperatures and the very low amounts of energy used in the pulse heating wires relative to the amounts of energy used in the conventional counter electrodes of brass eliminates furthermore completely the previously known problems of heat damages of the plastic material within and outside the weldings in form of shrinkings or formation of bulges. Another factor assisting in overcoming the latter problem is that the pulse heating wires are only heated in the very short period during which the welding is performed, whereafter the current is interrupted and the excess heat is then very quickly carried away by the cold fixing plane. Accordingly, the method is not encumbered with problems of breaks which might involve damaging heat effects on the plastic material. The energy consumption for the welding is low, and accordingly considerable amounts of energy are saved relative to the energy consumption of the conventional heat contact welding and HF-welding. In addition, the initial heating period of the welding press has been limited to the period necessary for heating the welding electrode to the relatively low temperature. Furthermore, no narrow restrictions apply to the method according to the invention with respect to the length of the weldings to be performed, whereas the conventional heat contact welding usually cannot perform weldings of a length exceeding approximately 700 mm due to the difficulties and costs involved in the production of counter electrodes, which in long lengths are sufficiently accurate at the high temperatures. Yet another advantage of the method according to the invention is that it turned out surprisingly that the method allows a welding through materials being substantially thicker than it was previously considered possible by the heat contact welding, and while still maintaining the outstanding quality of the welding seam. So far tests have proved that it is possible without problems to weld total sheet thicknesses of at least 3000 $\mu$m with a good result and merely by prolonging the welding period, where the upper limit of the conventional heat contact welding was considered to be about 600 $\mu$m total sheet thickness before the welding.

Various modifications of the method for many purposes can be obtained by using welding and counter electrodes presenting an annular welding pattern. Such a modification can for instance advantageously be used for producing many articles welded from a large plastic material, by welding annular members therein, and furthermore for producing separating lines in a packing so as to allow an easy opening thereof. By the expression "annular welding pattern" is in this connection meant any pattern including a substantially coherent, circumferential welding/parting/embossing seam surrounding a non-welded area.

Although the method according to the invention can be performed on a welding press without a depth stop for a number of purposes, such as when weld cuttings are to be performed, where the welding electrode therefore must penetrate the material completely, it can be advantageous or necessary for other purposes to use a welding press with a depth stop with a high setting accuracy so as during the welding to ensure a minimum distance between the welding electrode and the counter electrode with the associated insulating layers, and to set the depth stop to a minimum distance corresponding to or being smaller than the total thickness of the material between the electrodes.

The latter applies for instance to the production of packings with airtight separating lines facilitating an opening later on of the packing, and then the depth stop is advantageously set to a minimum distance between the electrodes corresponding to an interval of between approximately 20% and approximately 80%, especially between approximately 30% and approximately 70%, of the thickness of the material between the electrodes. Tests have proved that as far as plastic sheets are concerned just a modest reduction of the thickness in the separating lines is necessary for achieving an effect ensuring that the packing is easily opened along said lines. The latter applies in particular to the situation where the tearing up is effected parallel to the separating line, whereas a tearing up transverse to a welding seam/separating line is very difficult to carry out.

According to a particular modification, the method uses a welding electrode, which is of a concave, especially substantially hollowed welding profile, as well as a depth stop. As a result, it is for instance in connection with welding in a sheet of polyolefine of a thickness of 200 μm possible to produce a double seam in the material. The double seam includes two closely arranged, parallel separating lines interconnected at the ends, and an intermediary thickened strand or string of compressed sheet material. The string is easily pulled out of the sheet lengthwise so as thereby to separate the sheet. A welding of a gripping member, such as a wafer, onto the end of the string has furthermore the effect that it is particularly easy to grip the wafer on the completed packing so as to pull the string out of the sheet and thereby open said packing. Other modifications allowing production of an annular separating line in the sheet can be used for the production of a broad strip-shaped tearing-up strand or string. The latter strand or string can also be provided with a gripping member welded thereon and in form of a wafer, which in turn is loosely secured to the sheet in such a manner that the sheet is not torn up unintendedly.

It is obvious that most of the drawbacks of the conventional heat contact welding are due to the effect of undesired amounts of heat in the areas inside and outside the welding seams. A general reduction of the temperature, especially in the counter electrode, implies, however, a considerably lower production rate, and it must be assumed that the conventionally used counter electrodes involve problems of feeding the heat energy necessary for the welding sufficiently quickly to the welding spot unless the process is carried out at high temperatures. Especially in this respect the invention is particularly favorable because the used heat source allows a generation of the energy immediately at the welding spot as well as a control of the temperature in the counter electrode so efficiently that the optimum temperature always applies therein.

So far tests indicate that it is possible to obtain satisfactory results provided the temperature of the pulse heating wire(s) is controlled by means of the electronic regulator within a range of ±4° C., especially within ±2° C. The tests performed so far operate with a regulator of the type "Resistron type RES-220" by Ropex Industrie Elektronik GmbH, D 7120 Bietigheim-Bissingen, Germany.

The quality of the welding carried out by the method according to the invention is not as sensitive to variations in the thickness and the nature of the material as the quality of the conventional heat welding, but when several pulse heating wires are used it is according to the invention preferred to individually set and control the temperature and the heating period of the pulse heating wires. In addition the invention allows the use of intersecting pulse heating wires, which are mutually electrically insulated and arranged on different levels, and furthermore a filling of at least a portion of the space found along a pulse heating wire on the level of an intersecting pulse heating wire opposite the intersections with a suitable heat-conductive material, such as a tape.

According to a modification of the method according to the invention a pattern of pulse heating wires on the fixing plane is provided for each new welding pattern, the individual pulse heating wires being arranged so as to be movable in their longitudinal direction between electrically insulating, heat-conducting separating layers arranged on the fixing plane. As a result, it is ensured that the individual pulse heating wires are kept stretched by means of suitable means in connection with the unavoidable extension during the heating procedure, whereby said pulse heating wires remain correctly positioned.

When a welding press with a welding plane and a fixing plane is used, it is according to the invention preferred to arrange the pulse heating wire(s) by means of wire stretchers in slide mountings displaceable in slide guides at the edges of the fixing plane, and to arrange measuring sticks at the side edges of the fixing plane and the welding plane, said measuring sticks allowing a reading of the position of the welding electrode and an easy positioning of the pulse heating wire(s) in the correct position. In this manner the method allows production of a counter electrode in a very easy and fast manner.

The welding press according to the invention is characterized in that the fixing plane is preferably a non-heated, especially water-cooled plane fixing a counter electrode comprising one or several pulse heating wires, which are mutually and outwardly electrically insulated and together cover the welding electrode, and in that a heat-conducting separating tape of a higher melting point than the plastic material is arranged between the pulse heating wire(s) and the material, especially in form of a conveyor belt for the material, whereby each pulse heating wire communicates with a current source and an electronic regulator allowing an individual and very accurate setting and regulation of the temperature and the heating period for each pulse heating wire. The electronic regulator is such that during the welding, such as at intervals of 20 milliseconds, it can measure the voltage across and the current intensity in the pulse heating wire and thereby provide an indication of the temperature of the pulse heating wire, whereby the regulator can correct deviations from the set value and control the temperature of the pulse heating wire during operation within a temperature range of ±2° C. As a result, the temperature in the pulse heating wire can be reliably kept within the narrow temperature range of 8° C. which is the only temperature range that can be used for welding polypropylene.

The resulting welding press is considerably less expensive than a conventional welding press for heat contact welding because the complicated heating and cooling device for the fixing plane has been avoided. In addition, no costs are involved for expensive counter electrodes because, as mentioned, said counter electrodes are according to the invention made of tape or the like electrically insulating and heat-conducting materials in addition to the pulse heating wires. Said pulse heating wires are relatively inexpensive compared to the conventional electrodes, and furthermore they can be reused in other electrode assemblies. Another advantage is found in the fact that the costs involved in the current supply and the electronic regulator are relatively modest too. The welding press according to the invention is furthermore advantageous in the cold fixing plane providing an excellent lay out place for the material to be welded without involving a risk of said material being damaged or the user being incommodated by heat.

For many purposes of use, an advantage is according to the invention obtained by the welding and counter electrodes presenting an annular welding pattern. The advantage obtained is evident in connection with electrodes to be used for weld-cutting of articles from a sheet or a length of material, for welding on of annular articles, and for welding in of separating lines so as to produce tear-up strips or strings facilitating the opening of a packing.

The welding press may advantageously be provided with a depth stop with a high setting accuracy, preferably a setting accuracy superior to $\pm 100$ $\mu$m, especially superior to $\pm 20$ $\mu$m, with the result that it is always possible to produce a welding seam of an exact thickness responding to the material thickness involved and the purpose of the welding process. Thus it is possible to perform heat weldings of an outstanding quality even in materials which are difficult to weld, such as polypropylene, and in thin and thick materials as well.

A tear-up string requiring a particularly small amount of material and space can be produced by the welding electrode being of a concave, especially substantially hollowed welding profile. In this connection it is often possible in many situations only to use a single, rectilinear pulse heating wire as counter electrode with the result that the tool has been simplified and is less expensive.

The used pulse heating wire presents advantageously a linear temperature/resistance ratio and is of a cross section of approximately 4 mm times 0.1 mm corresponding for instance to a 3 mm broad welding electrode, said pulse heating wire further comprising an active zone extending maximum 5 mm beyond the corresponding end restrictions of the welding electrode, whereby the pulse heating wire is coppered or shaped in another manner outside the active zone so as to possess a high electric conductivity. In this manner a reliable control of the temperature in the pulse heating wire is obtained by means of the regulator, and the limitation of the active zone so as substantially to correspond to the dimensions of the welding electrode ensures achievement of the necessary heating exactly in the welding area, but not outside said area.

A particularly simple and inexpensive counter electrode is obtained by the pulse heating wire(s) being kept to the fixing plane and electrically insulated both relative thereto, mutually, and outwardly by means of tape.

In order to facilitate the alteration of the structure of the counter electrode, the pulse heating wire(s) may be secured at the ends to slide mountings by means of wire stretchers, said slide mountings being displaceable in guides along the side edges of the fixing plane. In this manner it is possible constantly to keep the pulse heating wires stretched and to easily move them by a displacement along the guides.

A fast and reliable providing of the counter electrode on the fixing plane can furthermore be ensured by both the welding plane and the fixing plane being provided with measuring sticks along their side edges, the graduations of said measuring sticks on the two planes exactly opposing one another. Once the welding electrode has been arranged on the welding plane, it is possible immediately to read on the measuring sticks where to place the counter electrode on the fixing plane.

In order to additionally facilitate the above providing of the counter electrode, the fixing plane may be such that while guided on guides or in guideways it is displaceable between a welding position inside the press and a mounting position outside the press. In this manner the user need not bend over the fixing plane in the press, but can perform the mounting conveniently outside said press whereafter he pushes the fixing plane into the welding position in the press.

The counter electrode may furthermore advantageously comprise mutually intersecting pulse heating wires arranged on different levels and being mutually electrically insulated in the intersections, preferably by means of polyimide sheet, where at least a portion of the space found along a pulse heating wire on the level of an intersecting pulse heating wire has been filled with a suitable, heat-conducting material, such as tape, of substantially the same thickness as the pulse heating wires. In this manner it is indeed obtained that a counter electrode with intersecting pulse heating wires is provided with an almost plane surface, and furthermore that the individual pulse heating wires operate electrically independent of one another. The results obtained so far have proved that often the slightly differing distances presented to the various pulse heating wires by the material to be welded are of no practical importance for the result. It is besides easy to compensate for the above differences by operating with individually setable temperatures and welding periods for the individual pulse heating wires in the same welding pattern. The latter possibility of individually regulating the heat capacity of the individual pulse heating wires is furthermore of great importance when the material to be welded presents substantially differing thicknesses opposite the various pulse heating wires.

The used pulse heating wires are in principle standard wires and are available in a number of varying qualities, cross sectional dimensions, and lengths, both of rectangular and circular, oval or a more composite cross section, and thus it is possible to structure the counter electrode with a plane, a curved or a more composite surface shape. Rectangular pulse heating wires are usually available in dimensions of a width of a few mm and a thickness in the magnitude 100 to 300 $\mu$m, but other dimensions are also available. It is possible to directly place such a thin pulse heating wire in a curved position across a portion of its longitudinal direction with the result that it is possible to weld across a surface with projecting projections. In this connection it may, however, be necessary to replace the welding electrode with a suitable holder-on and optionally only involve a one-sided heat supply from the pulse heating wire. It is also possible to supply heat by means of pulse heating wires from both sides of the plastic material to be welded. In some cases it is in addition possible to shape the pattern of the counter electrode by means of a single specially produced pulse heating wire formed in the pattern in question.

The welding electrode may be a conventional HF-electrode of a good quality. It is, however, advantageous to operate with a cutting edge being higher than usually on such electrodes, because a compressing of the sheets in the welding seam appears to be less necessary than in connection with an HF-welding.

BRIEF DESCRIPTION OF THE DRAWING

The invention is explained in greater detail below by means of embodiments and with reference to the accompanying drawing, in which.

BEST MODE FOR CARRYING OUT THE INVENTION

Figure 1:
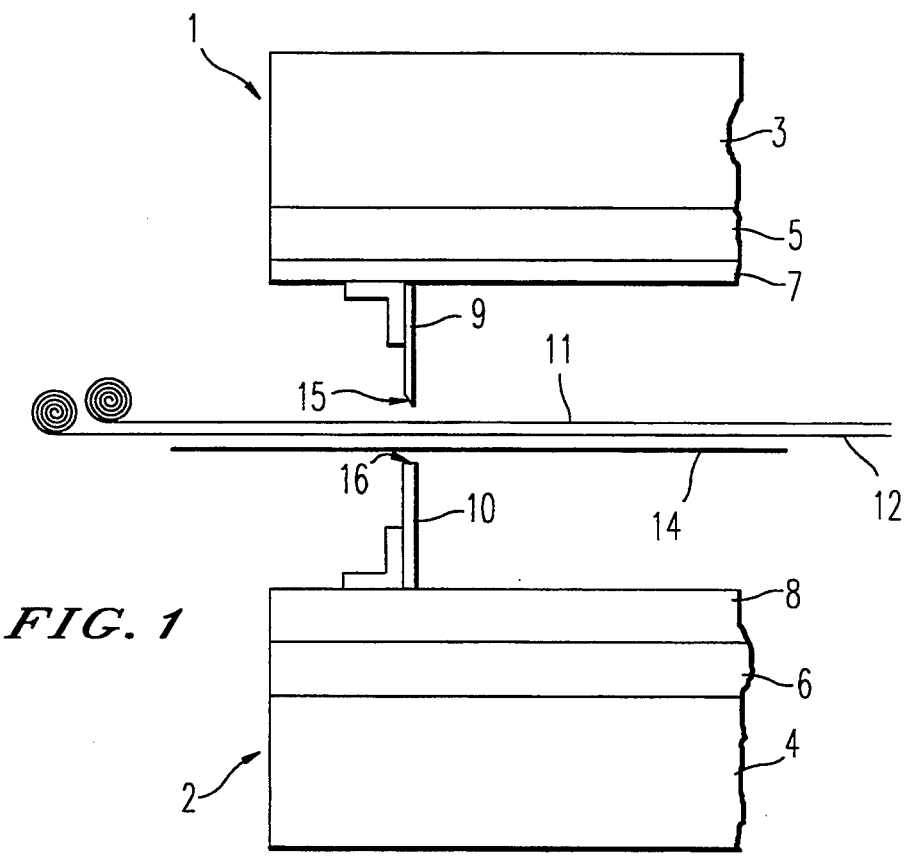
FIG. 1 is a side view of the fundamental structure of a conventional welding press for heat contact welding.

FIG. 1 is a side view of the fundamental structure of a conventional heat press for heat welding. The heat press comprises a top plane 1 and a bottom plane 2, respectively. In sequence, the top plane comprises an aluminium plate 3 with a not shown heating device and a not shown thermostate, a top tool 5, and a welding plane 9 with a top electrode 9 (here the welding electrode). Correspondingly, the bottom plane 2 comprises in sequence an aluminium plate 4 with a not shown heating device and a not shown thermostate, a bottom tool 6, and a mounting plate 8 for a bottom electrode 10 (here the counter electrode). The profile 15 of the top electrode appears here with a cutting edge, whereas the profile 16 of the bottom electrode is plane, whereby the shown plastic sheets 11, 12 are simultaneously provided with a parting seam during the welding. A separating tape 14 is inserted between the plastic sheets 11, 12 and the bottom electrode 10, said separating tape being made of a material of a higher melting point than the plastic sheets 11, 12, such as of polyimide.

Figure 2:
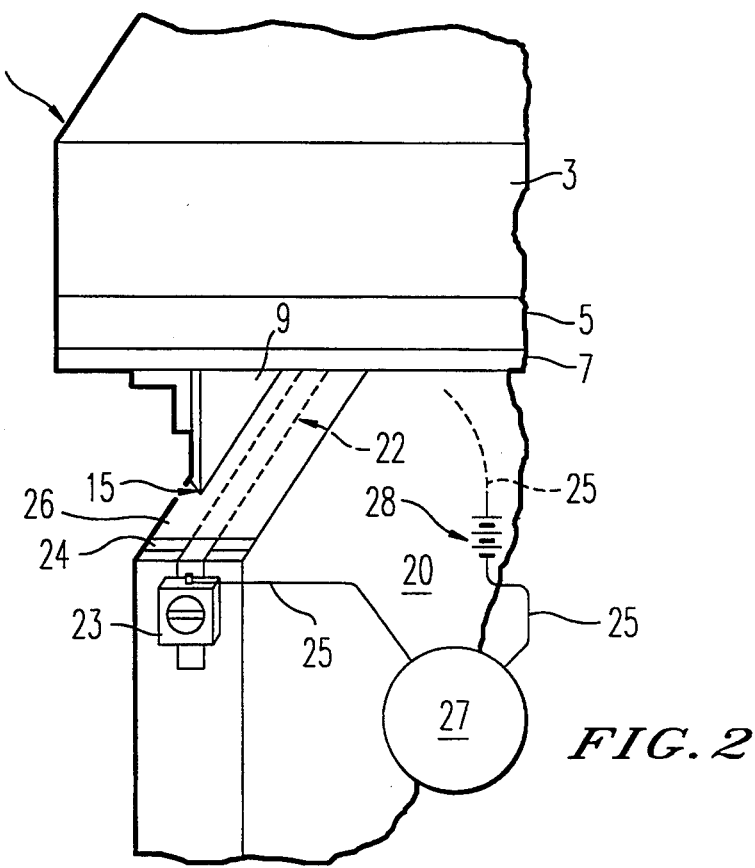
FIG. 2 is a perspective view of a portion of a welding press for a ruler welding according to the invention.

FIG. 2 illustrates an example of the fundamental structure of the top plane and the bottom plane of a welding press according to the invention for ruler welding. The welding press comprises a top plane 1 fundamentally structured like the top plane 1 of FIG. 1, and a bottom plane in form of a relatively narrow fixing plane 20 optionally being water-cooled. A pulse heating wire 22 is mounted on the top side of the fixing plane 20 between two strips of Teflon or Kapton-tape 24, 26 adhered to the fixing plane 20 and to one another, respectively, said adhering, however, being such that the pulse heating wire 22 can be moved freely in its longitudinal direction between said strips 24, 26. The width of the pulse heating wire 22 is slightly larger than the width of the welding profile 15 on the welding electrode 9. The thickness of the pulse heating wire is for instance 0.1 mm. At both ends, the pulse heating wire 22 is stretched in a wire stretcher 23 secured to the fixing plane 20 and simultaneously operating as a current connector. Conduits 25 connect the pulse heating wire 22 with a current source 28 and an electronic regulator 27 capable of regulating the temperature in the pulse heating wire within a range of ±2° C. relative to a set temperature.

Figure 3:
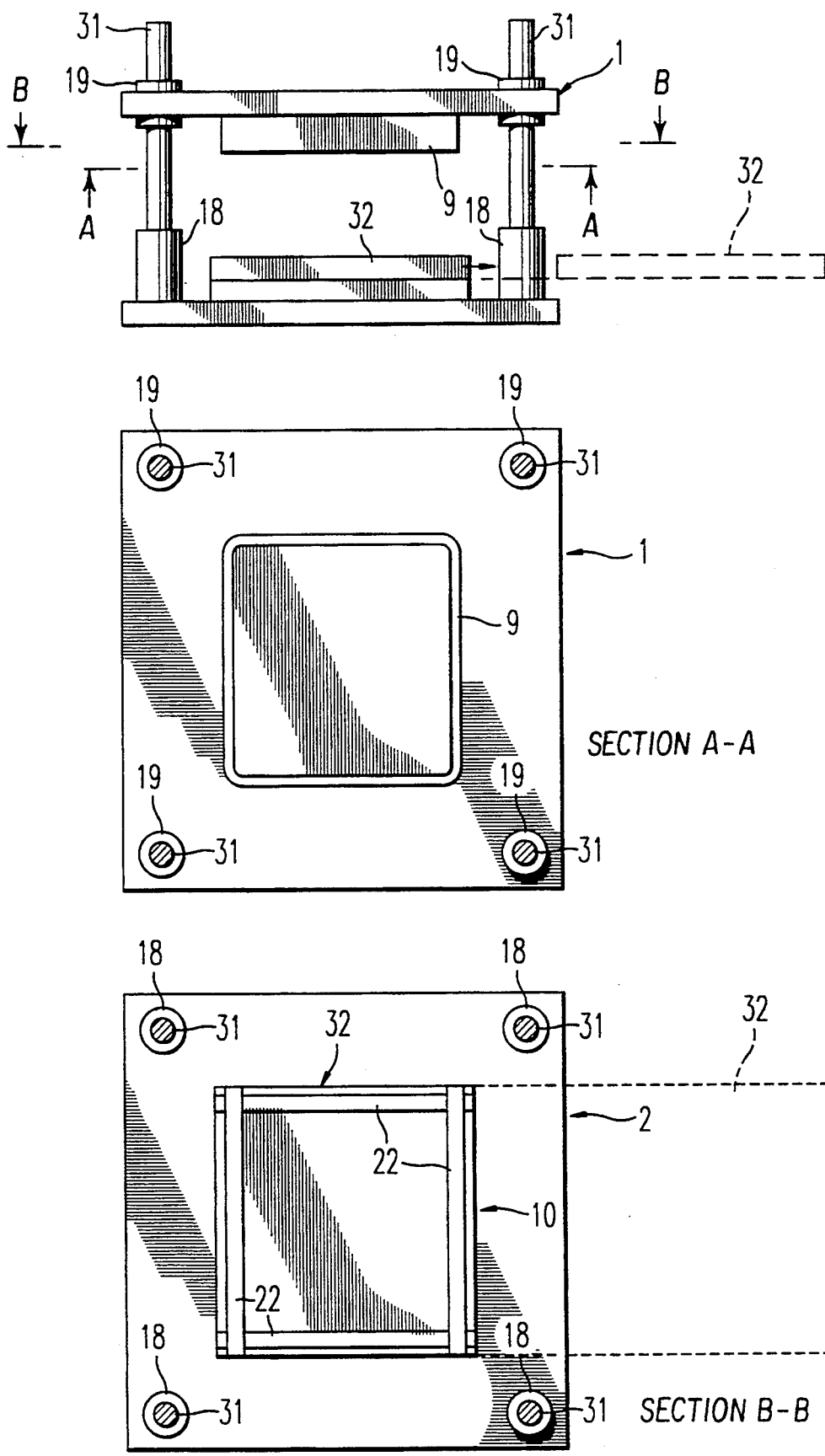
FIG. 3 is a diagrammatic view of a welding press according to the invention with electrodes for the welding of a square welding pattern, shown from the side, towards the welding plane, and towards the fixing plane, respectively.

FIG. 3 is a diagrammatic view of the fundamental structure of a welding press according to the invention for welding two-dimensional welding patterns, shown by way of a side view and sectional views along the line A—A and B—B, respectively. The illustrated welding press comprises four columns 31 mounted on the bottom plane 2 and operating as guides for the top plane 1. A welding electrode 9 with a square welding pattern is mounted on the top plane 1. The bottom plane 2 is here provided with a displaceable fixing plane 32 displaceable outside the top plane 1 with the result that the counter electrode 10 can be mounted on said fixing plane 32 while it is displaced outside the press. The illustrated counter electrode 10 comprises here four pulse heating wires 22 intersecting one another in pairs in the corners of the welding pattern. The pulse heating wires 22 may be adhered directly onto the fixing plane 32 with tape strips therebetween in such a manner that said pulse heating wires 22 can be moved in their longitudinal direction on the fixing plane and with a particular structure out of level in the intersections. The detailed structure of a wire intersection appears from FIG. 8. Depth stops possessing a high adjustment accuracy can be adjustably secured to the bushings 18, 19 for the columns 31 for the setting of the minimum distance between the electrodes 9 and 10.

Figure 4:
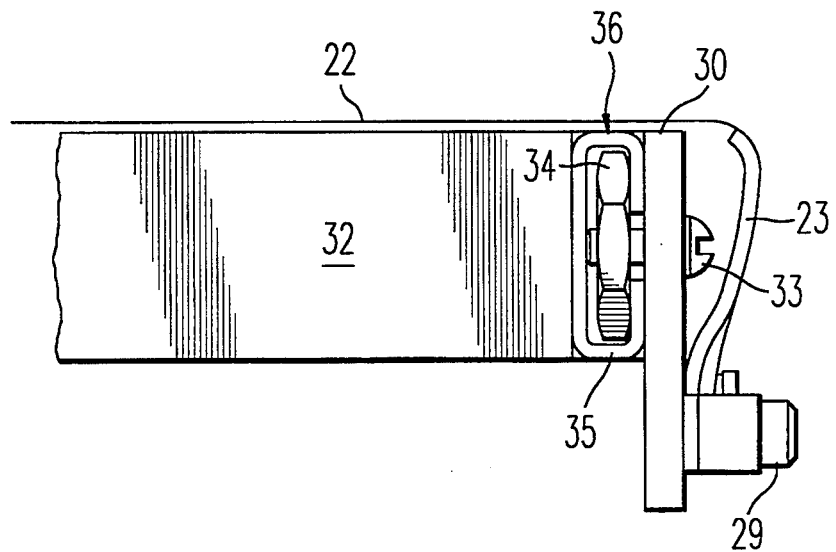
FIG. 4 is a side view of a portion of a fixing plane with a slide guide and wire stretchers.

FIG. 4 is a side view of a detail of a fixing plane 32 with a pulse heating wire 22 and an alternative mounting device for said wire. The pulse heating wire 22 is here secured at each end to a resilient wire stretcher 23 with a current connector 29. The wire stretcher ensures that the wire 22 is stretched at various temperatures and heat expansions. In turn, the wire stretcher 23 with the current connector 29 is secured to a slide mounting 30, which can be displaceably retained in a slide guide 35 by means of a screw 33 and a nut 34, said slide guide 35 in turn being secured to the edge of the fixing plane 32. The top side of the slide guide 35 is furthermore provided with a measuring stick 36 assisting in determining the position of the pulse heating wire 22 on the fixing plane 32.

Figure 5:
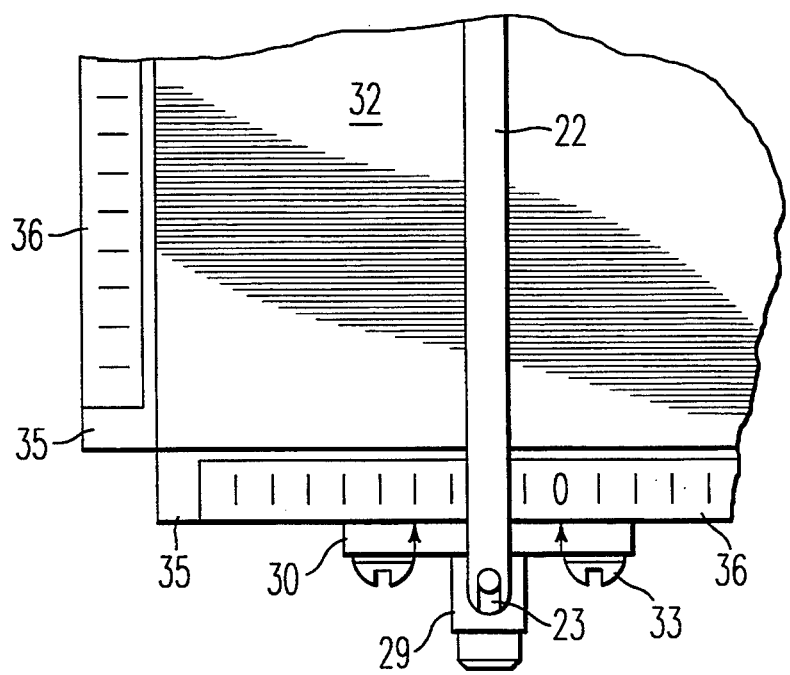
FIG. 5 illustrates a corner portion of the portion of FIG. 4 with measuring sticks and perpendicular to the fixing plane.

FIG. 5 illustrates the fixing plane 32 described in connection with FIG. 4. FIG. 5 is a top view of the fixing plane comprising a pulse heating wire 22 mounted on a wire stretcher 23 and with a slide mounting 30 and a slide guide 35 as well as a measuring stick 36. In addition, FIG. 5 shows a slide guide 35 and a measuring stick along the adjacent side of the fixing plane 32.

Figure 6:
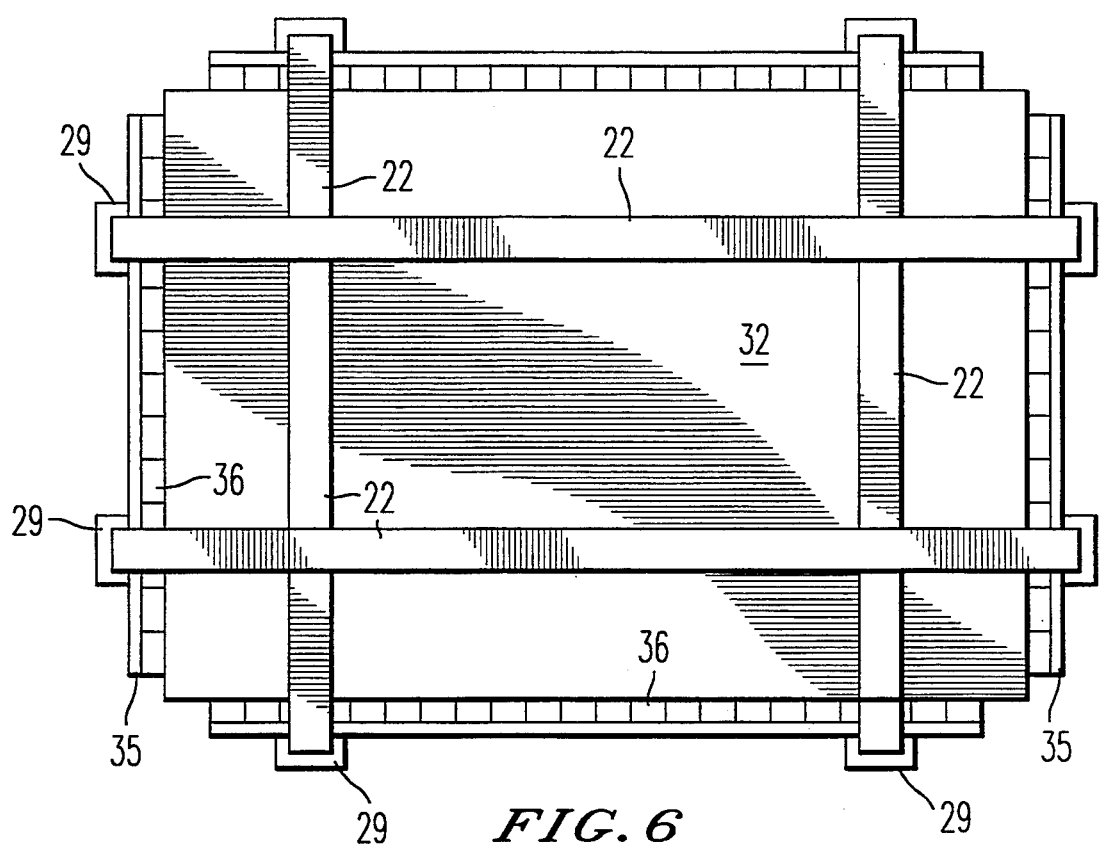
FIG. 6 illustrates a fixing plane with two pairs of intersecting pulse heating wires, measuring sticks, slide guides, and wire stretchers, shown perpendicular to the plane.

Correspondingly, FIG. 6 is a top view of a fixing plane 32 with four pulse heating wires 22 stretched in a pattern of a counter electrode 10, where each pulse heating wire is provided with wire stretchers with current connectors and is mounted with slide mountings in the slide guide 35 and provided with a measuring stick 36.

Figure 7:
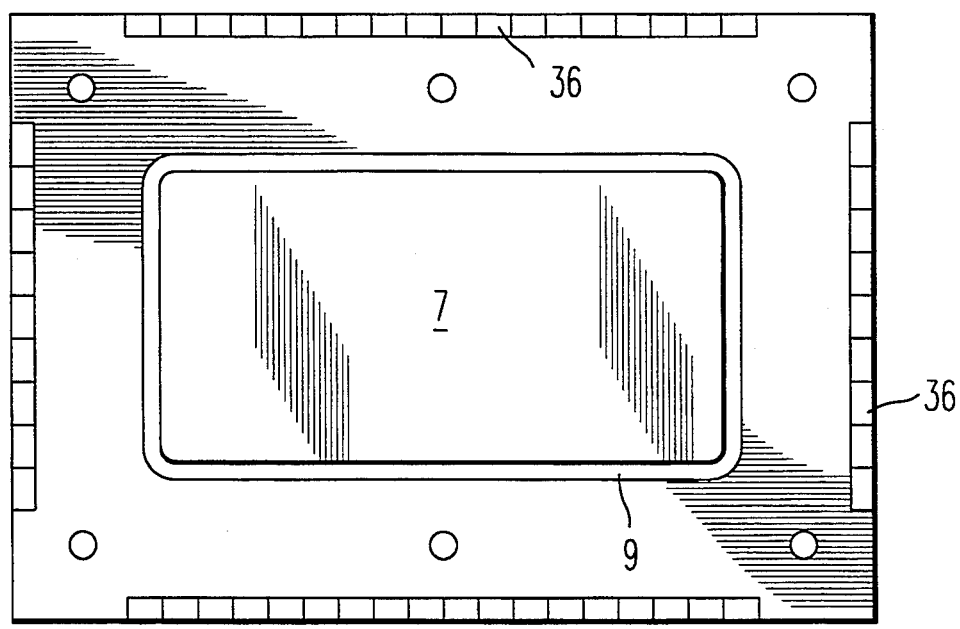
FIG. 7 illustrates a welding plane with measuring sticks and welding electrode and mating the fixing plane with the electrode pattern shown in FIG. 6.

FIG. 7 is a bottom view of a top plane 1 with a welding electrode 9 mounted thereon in a pattern corresponding to the pattern of the counter electrode 10 of FIG. 6.

Figure 8:
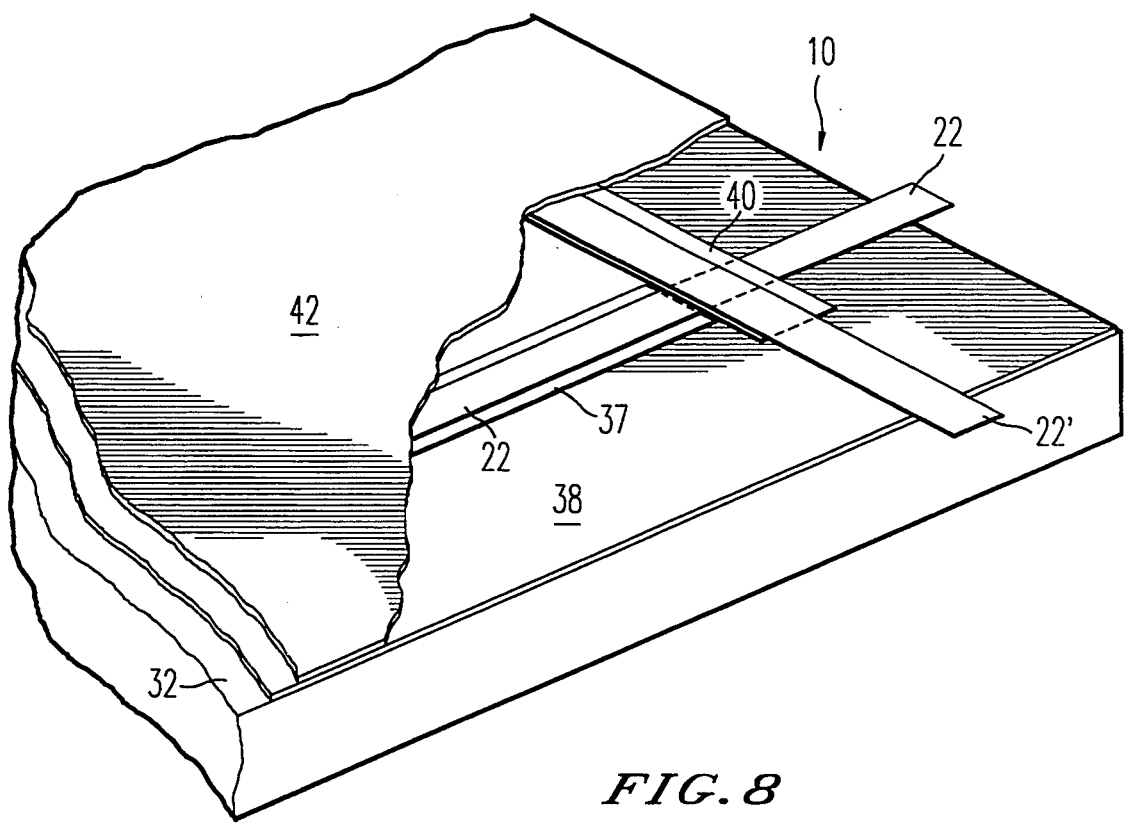
FIG. 8 illustrates a corner portion of a fixing plane with the fundamental structure of a counter electrode with an intersection between two pulse heating wires.

FIG. 8 illustrates the structure of a counter electrode 10 on a fixing plane 32. The counter electrode 10 comprises two intersecting pulse heating wires 22, 22' and has been supplemented with electrically insulating and heat-conducting Kapton-layers and strips of Teflon-tape. In sequence, the counter electrode 10 is structured as follows:

a. An electrically insulating and heat-conducting Kapton-layer 38 is placed on the fixing plane 32, atop which a strip of Teflon-tape 37 is adhered.
b The lower pulse heating wire 22 is mounted on top of the tape strip 37.
c A strip of Teflon-tape 40 is mounted across the lower pulse heating wire 22 so as to abut the strip of Teflon-tape 37.
d A transverse upper pulse heating wire 22' is mounted on top of the tape 40, followed by
e placing of an uppermost, electrically insulating and heat-conducting Kapton-layer 42 on top of the pulse heating wire 22'.

Subsequently, the resulting counter electrode 10 comprises two intersecting pulse heating wires 22, 22', which are electrically insulated from the fixing plane, one another, and outwardly by means of the Kapton-layers and the Teflon-tape, and which in addition are of a uniform thickness across the fixing plane 32 apart from in the intersection where an additional single layer of pulse heating wire is provided. The difference in thickness is usually of the magnitude 100 μm and is in practice of no interfering importance.

Figure 9A:
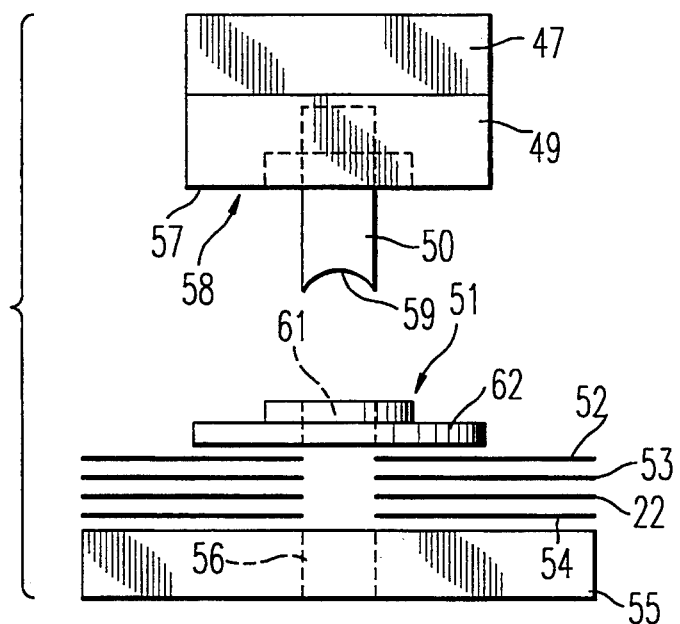
FIG. 9a is a side view in principle of a welding tool for welding a ring onto a sheet.
Figure 9B:
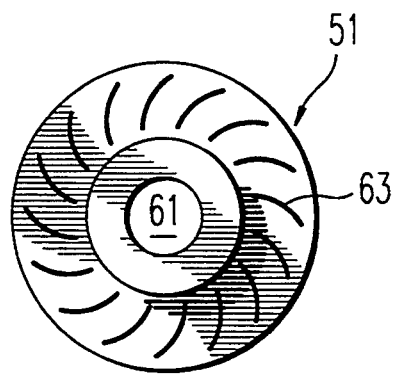
FIG. 9b is a top view of the ring welded on, FIG. 9c is a top view of the annular counter electrode used for the welding on of the ring.
Figure 9C:
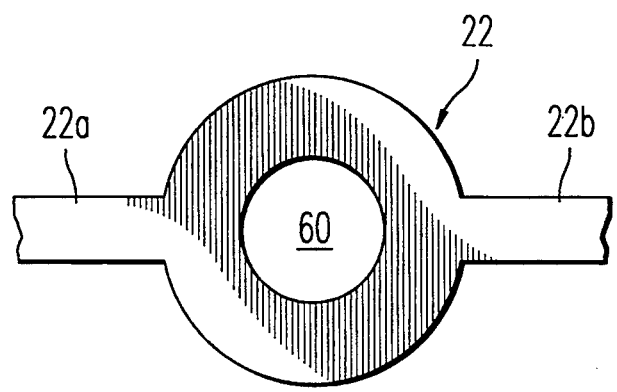

FIGS. 9a, 9b, and 9c show in principle an assembly with specially produced welding tools including annular electrodes 49, 22 for welding a circular plastic ring 51 onto a plastic sheet 52, while in the same process punching out a central portion of the sheet found at the centre of the ring. FIG. 9a is a side, partially exploded view of the assembly, FIG. 9b is a top view of the ring welded thereonto, and FIG. 9c is a top view of the annular counter electrode. The tools include an upper welding plane 47 arranged on a top plane not shown, said welding plane being electrically heated. In addition, the tools include a welding electrode 49 with an annular welding pattern 57 and arranged on the welding plane, where the electrode presents an engraved welding profile 58. A punching needle 50 presenting a concave punching profile 59 is arranged at the center of the electrode. The counter electrode comprises an annular pulse heating wire 22 with diametrically arranged inlets 22a, 22b for current connectors not shown and with a central opening 60 of a diameter being substantially larger than the diameter of the punching needle 50. The pulse heating wire 22 is secured with an intermediary electrically insulating Teflon-layer 54 onto the top side of a steel roundel 55. The steel roundel 55 comprises a central opening 56, the edge of which assists the punching needle 50 in the punching. A second Teflon-layer 53 is arranged on top of the pulse heating wire 22, and the plastic sheet 52 and the ring 51 are arranged on top of the second Teflon-layer 53 in such a manner that the opening 61 in the ring, the opening 60 in the pulse heating wire, and the opening 56, respectively, in the roundel flush with the longitudinal axis of the punching needle 50. Fundamentally, the ring 51 is welded on in the same manner as described in connection with the explanation of the method according to the invention, viz. the welding electrode is pressed against the outer annular portion 62 of the ring 51, and the ring is welded by the pulse heat from the electrode 22 onto the sheet in said portion after the punching needle 50 having been inserted through the openings 61, 60, 56 in the ring, the pulse heating wire and the roundel having punched out an opening in the plastic material. The welding provides the ring 51 with a profiled pattern 63 corresponding to the pattern 57 and the profile 58 in the annular welding electrode. As an alternative, the punching needle can be omitted and the ring and the electrodes can be provided with other shapes.

Figure 10A:
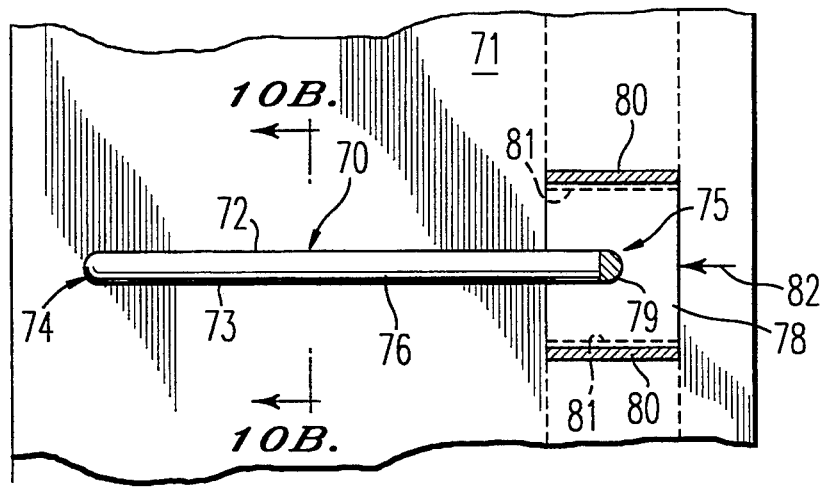
FIG. 10a illustrates the fundamental structure of an annular parting seam for the formation of a tear-up string shown with a wafer welded thereon.
Figure 10B:
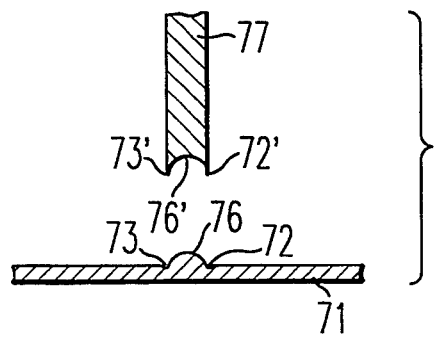
FIG. 10b is a sectional view on a larger scale taken along the line B—B of FIG. 10a, the associated welding electrode profile being inserted, FIG. 10c corresponds to FIG. 10a, but where the parting seam is placed in a packing with sliced food.
Figure 10C:
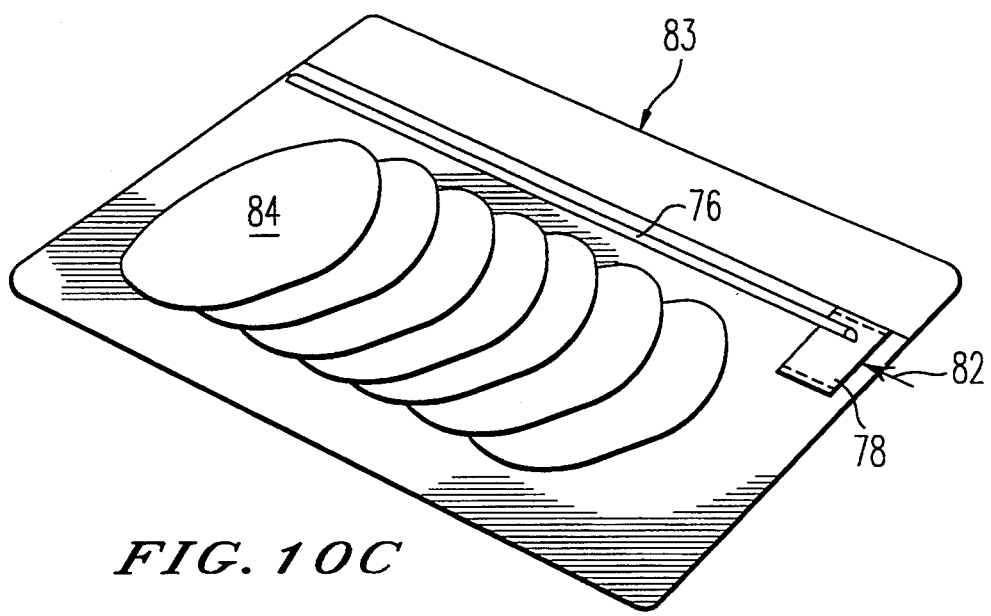

FIGS. 10a, 10b, and 10c illustrate an example of the use of the invention for producing a tear-up string 76. FIG. 10a and 10b illustrate such a string 76 formed in and of a plastic sheet 71 during the welding of an annular parting seam with two closely arranged separating lines 72, 73. The separating lines are coherent at the ends 74, 75 and provided with a thickened central portion 76 made of compressed plastic material from the sheet 71, said central portion forming the string 76. FIG. 10b is a sectional view along the line B—B of FIG. 10a through the sheet 71 with the produced string 76 and a portion of the used welding electrode 77. It appears directly that the used electrode 77 presenting the concave profile with two pointed ends 72', 73' and a concave hollowing 76' therebetween allows production of two parallel separating lines 72, 73 and a thickened portion 76 therebetween. Accurate depth stops in the press can ensure that the sheet material 71 in the separating lines 72, 73 is not perforated, but remain air- and water-tight. FIG. 10a illustrates furthermore a gripping member in form of a wafer 78 which is welded at 79 onto one end 75 of the string. Two opposing sides of the wafer 78 are welded at weldings 80 onto the sheet material 71 and are perforated at 81 inside said weldings 80. In this manner the wafer 78 is retained to the sheet 71 at conventional use, but when the perforations 81 are broken by the user inserting one finger at the arrow 82, said wafer is easily loosened. Subsequently by pulling in the wafer 78, the user can easily tear the string 76 out of the sheet 71 along the separating lines 72, 73. In FIG. 10c the described tear-up string 76 has been used for a packing 83 for sliced food 84.

Figure 11A:
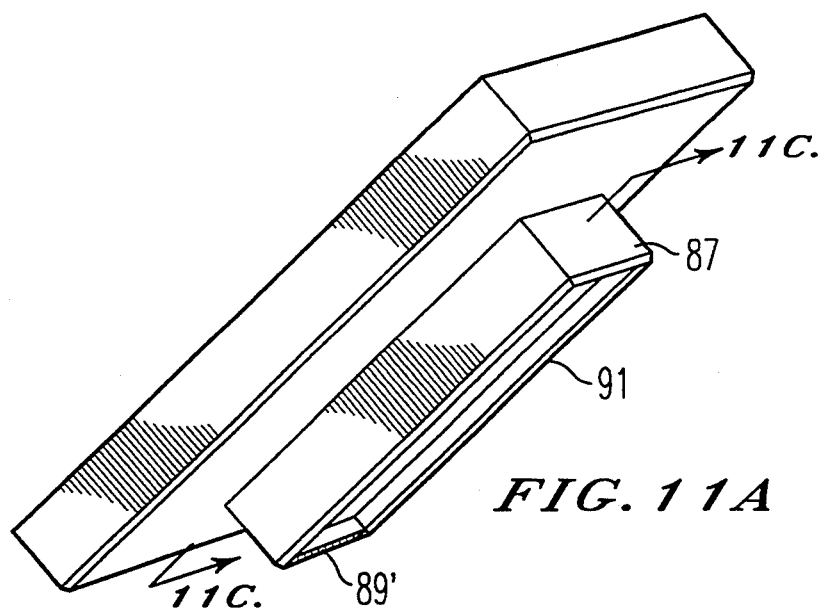
FIG. 11a illustrates the fundamental structure of a second annular welding seam for the formation of a tear-up strip shown with a wafer welded thereon.
Figure 11B:
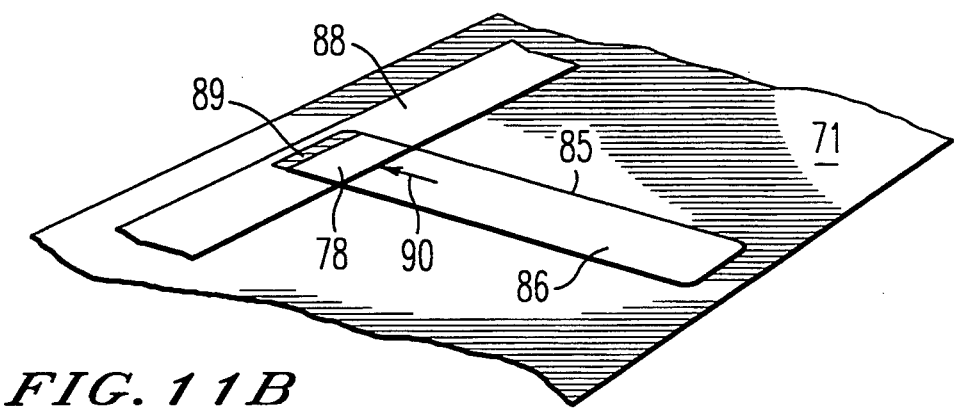
FIG. 11b is a perspective view of the welding tool with a welding electrode for carrying out the parting seam of FIG. 11a, FIG. 11c is a sectional view taken along the line C—C of the welding tool of FIG. 11b.
Figure 11C:
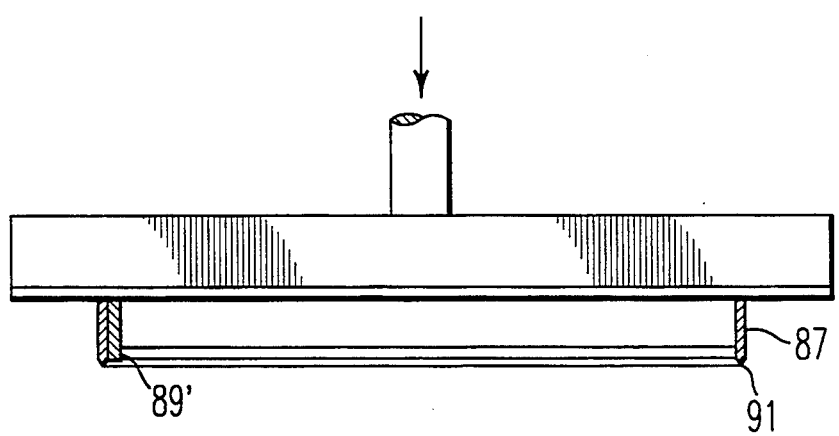

FIG. 11a illustrates the fundamental structure of a second annular parting seam 85 for the formation of a tear-up strip 86 in a plastic sheet 71, and FIGS. 11b and 11c illustrate the associated welding electrode 87. The tear-up strip 86 is in turn formed by welding a circumferential parting seam 85 which then only includes a single separating line. A portion of a transverse plastic strip 88 is welded at one end of the strip 86 onto the tear-up strip 86 at 89 and along the sides to form a wafer 78. The wafer can be loosened by inserting a finger at the arrow 90, whereafter the strip 86 can be torn up by a pull in the wafer 78. FIG. 11b illustrates the associated welding electrode 87 presenting a profile with only one cutting edge 91. The electrode 87 comprises furthermore an extra profile portion 89' at one end to form the welding 89. FIG. 11c is a sectional view along the line C—C of FIG. 11b through the electrode 87, the shape of the cutting edge 91 and the extra profile portion 89' appearing.

Figure 12A:
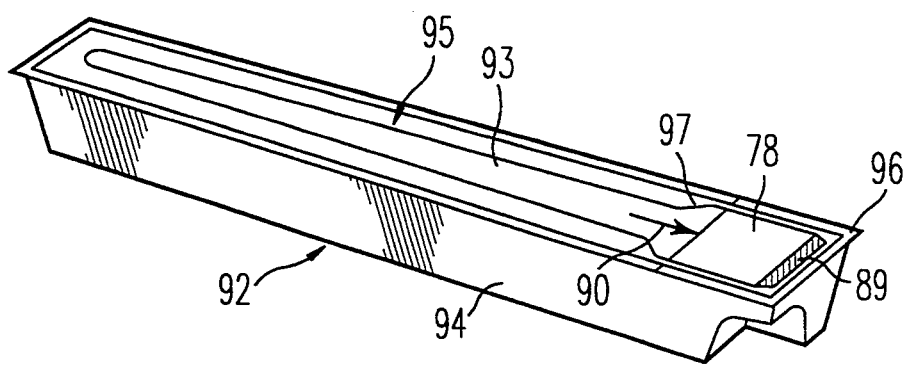
FIG. 12a illustrates a blister pack for a toothbrush with an annular parting seam welded therein for the tear-up strip with the wafer, and FIG. 12b corresponds to FIG. 12a, but shown during the tear-up movement of the tear-up strip.
Figure 12B:
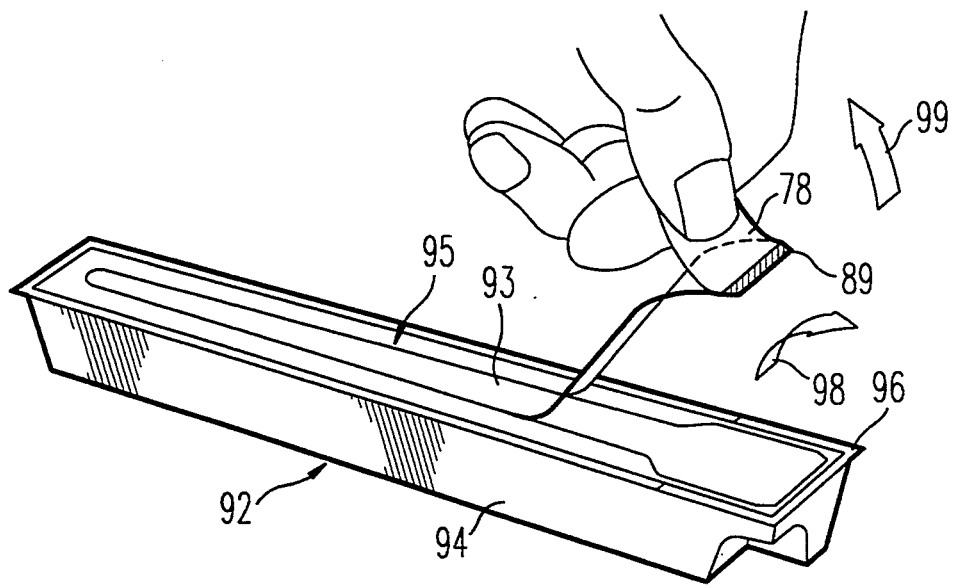

FIGS. 12a and 12b illustrate the use of the invention for producing a tear-up strip 93 in a known blister pack 92 for a toothbrush. The production of the blister pack 92 starts with a forming of the container 94 in a manner known per se, whereafter the cover part 95 with a tear-up strip 93 of fundamentally the same type as the tear-up strip 96 of FIG. 11a is welded onto the container 94 along the projecting circumferential flange 96 thereof. The tear-up strip 93 differs only from the strip 86 of FIG. 11a by comprising a narrowing portion at 97. The illustrated tear-up strip is furthermore shaped as the strip 86 and operates in the same manner by means of a wafer 78 welded onto the strip 93 at 89 and along its sides, and which can be loosened by inserting a finger below the free end edge at the arrow 90 and subsequently used for pulling out the tear-up strip 93, as indicated by the arrows 98 and 99 in FIG. 12b.

I claim:

1. A method of welding an embossing, welding or parting seam in at least one layer of material containing heat-weldable plastic material by means of indirect heating of the plastic material in a welding press, the method comprising the steps of:
arranging a welding electrode against a first side of the material, said welding electrode having a welding profile and pattern which matches a welding to be performed;
keeping a temperature of the welding electrode below a softening point of the plastic material;
arranging a counter electrode of a corresponding pattern against a second side of the material, said counter electrode comprising at least one pulse heating wire;
securing the at least one pulse heating wire to a non-heating fixing plane of said counter electrode such that the at least one pulse heating wire is mutually and outwardly electrically insulated, covers a pattern of the welding electrode, and projects a short distance beyond the welding electrode;
communicating said at least one pulse heating wire with a current source and an electronic regulator;
arranging a heat-conducting separating tape between the at least one pulse heating wire and the material, said heat-conducting separating tape having a higher melting point than the plastic material;
transmitting a current through the at least one pulse heating wire during welding and immediately before or after the welding press has been completely closed so as to heat the at least one pulse heating wire and emit heat to the material;
setting the electronic regulator to obtain a temperature in said at least one pulse-heating wire which is in a temperature range immediately above a melting point of the plastic material;
controlling the temperature of the at least one pulse-heating wire with said electronic regulator within a temperature range of $\pm 2°$ C. by measuring at intervals of 20 milliseconds a voltage across and a current intensity in the at least one pulse-heating wire;
providing an indication of the temperature of the at least one pulse heating wire and correcting deviations from a set value during a predetermined period which is sufficient for ensuring a desired result;
interrupting the current through the at least one pulse heating wire, thereby starting the cooling; and
opening the welding press so as to permit the material to be finally cooled on the non-heating fixing plane before an insertion of a further material for welding.

2. A method as claimed in claim 1, wherein the welding and counter electrodes present an annular welding pattern.

3. A method as claimed in claim 1, wherein the welding press comprises a depth stop with a high setting accuracy for ensuring a minimum distance between the welding electrode and the counter electrode with associated insulating layers during a welding procedure, the minimum distance corresponding to or being smaller than a total thickness of the material between the electrodes.

4. A method as claimed in claim 3, wherein the minimum distance between the electrodes corresponds to an interval of between approximately 20% and approximately 80% of the thickness of the material between the electrodes.

5. A method as claimed in claim 4, wherein the minimum distance between the electrodes corresponds to an interval of between approximately 30% and approximately 70% of the thickness of the material between the electrodes.

6. A method as claimed in claim 1, wherein the welding electrode has a concave substantially hollowed welding profile.

7. A method as claimed in claim 1, wherein said counter electrode comprises at least two pulse heating wires such that a temperature and heating period for the at least two pulse heating wires are individually set and controlled.

8. A method as claimed in claim 1, further comprising the use of mutually intersecting pulse heating wires, which are mutually electrically insulated and arranged on different levels, the method comprising the further step of filling at least a portion of a space along a pulse heating wire on a level of an intersecting pulse heating wire opposite the intersections with a heat-conductive material.

9. A method as claimed in claim 1, comprising the further step of providing a pattern of pulse heating wires on the fixing plane for each new welding pattern, the individual pulse heating wires being arranged so as to be movable in their longitudinal direction between electrically insulating, heat-conducting separating layers arranged on the fixing plane.

10. A method as claimed in claim 1, wherein the welding press comprises a welding plane, and the method comprises the steps of arranging the at least one pulse heating wire by means of wire stretchers in slide mountings displaceable in slide guides at edges of the fixing plane, and arranging measuring sticks at the edges of the fixing plane and the welding plane, said measuring sticks allowing a reading of a position of the welding electrode and a positioning of the at least one pulse heating wire in a correct position.

11. A welding press for welding an embossing, welding or parting seam in at least one layer of material containing heat weldable plastic material, the welding press comprising:

a welding plane and a fixing plane, the welding plane being provided with a welding electrode having a welding profile and pattern which matches a welding to be carried out, the fixing plane being a non-heated fixing plane;

means for keeping a temperature of the welding electrode constant within a temperature range of approximately 20° C., to approximately 250° C.;

means for moving at least one of the welding plane or the fixing plane towards and away from the other of the welding plane or fixing plane;

a counter electrode mounted on the fixing plane, said counter electrode comprising at least one pulse heating wire which is electrically insulated and covers a pattern of the welding electrode;

a heat-conducting separating tape having a melting point higher than the plastic material, the heat conducting separating tape being arranged between the at least one pulse heating wire and the material; and an electronic regulator and a current source, wherein the at least one pulse heating wire communicates with the current source, and said electronic regulator permits a setting and regulation of a temperature and heating period of the at least one pulse heating wire, wherein the electronic regulator measures a voltage across and current intensity in the at least one pulse heating wire at intervals of around 20 milliseconds during welding, to thereby provide an indication of a temperature of the at least one pulse-heating wire such that the electronic regulator corrects deviations from a set value and controls the temperature of the at least one pulse wire during the welding operation within a temperature range of ±2° C.

12. A welding press as claimed in claim 11, wherein the welding and counter electrodes present an annular welding pattern.

13. A welding press as claimed in claim 11, further comprising a depth stop with a high setting accuracy superior to ±100 μm.

14. A welding press as claimed in claim 11, wherein the welding electrode has a concave substantially hollowed welding profile.

15. A welding press as claimed in claim 11, wherein the at least one pulse heating wire has a linear temperature/resistance ratio and has a cross section of approximately 4 mm times 0.1 mm which corresponds to a 3 mm broad welding electrode, said pulse heating wire further comprising an active zone extending a maximum of 5 mm beyond corresponding end restrictions of the welding electrode, whereby the pulse heating wire is coppered or shaped in another manner outside the active zone so as to possess a high electric conductivity.

16. A welding press as claimed in claim 11, further comprising a depth stop with a setting accuracy superior to ±20 μm.

17. A welding press as claimed in claim 11, wherein the at least one pulse heating wire is mounted to the fixing plane and electrically insulated both relative thereto, mutually, and outwardly by means of tape.

18. A welding press as claimed in claim 11, wherein the at least one pulse heating wire is secured at its ends to slide mountings by means of wire stretchers, said slide mountings being displaceable in guides along side edges of the fixing plane.

19. A welding press as claimed in claim 11, wherein the welding plane and the fixing plane are provided with measuring sticks along their side edges, graduations of said measuring sticks on the welding plane and the fixing plane exactly opposing one another.

20. A welding press as claimed in claim 11, wherein while guided on guides or in guideways the fixing plane is displaceable between a welding position inside the press and a mounting position outside the press.

21. A welding press as claimed in claim 11, wherein the counter electrode comprises mutually intersecting pulse heating wires arranged on different levels and being mutually electrically insulated in the intersections by means of a polyimide sheet, wherein at least a portion of a space found along a pulse heating wire on a level of an intersecting pulse heating wire is filled with a heat-conducting material of substantially the same thickness as the pulse heating wires.

* * * * *